United States Patent
Tao et al.

(10) Patent No.: US 11,040,726 B2
(45) Date of Patent: Jun. 22, 2021

(54) ALARM SYSTEM OF AUTONOMOUS DRIVING VEHICLES (ADVS)

(71) Applicant: Baidu USA LLC, Sunnyvale, CA (US)

(72) Inventors: Jiaming Tao, Sunnyvale, CA (US); Yifei Jiang, Sunnyvale, CA (US); Dong Li, Sunnyvale, CA (US); Jiangtao Hu, Sunnyvale, CA (US); Liangliang Zhang, San Jose, CA (US); Liyun Li, San Jose, CA (US); Jingao Wang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 135 days.

(21) Appl. No.: 15/920,000

(22) Filed: Mar. 13, 2018

(65) Prior Publication Data

US 2019/0185018 A1 Jun. 20, 2019

Related U.S. Application Data

(60) Provisional application No. 62/599,398, filed on Dec. 15, 2017.

(51) Int. Cl.
| | |
|---|---|
| *B60W 50/14* | (2020.01) |
| *G06N 20/00* | (2019.01) |
| *G05D 1/00* | (2006.01) |
| *B60W 50/00* | (2006.01) |

(52) U.S. Cl.
CPC ........ *B60W 50/14* (2013.01); *B60W 50/0098* (2013.01); *G05D 1/0061* (2013.01); *G05D 1/0088* (2013.01); *G06N 20/00* (2019.01); *B60W 2050/143* (2013.01)

(58) Field of Classification Search
CPC ...... B60W 30/09; B60W 15/14; B60W 50/14; B60W 50/0098; B60W 2050/143; G06N 20/00; G05D 1/0088; G05D 1/0061
See application file for complete search history.

(56) References Cited

U.S. PATENT DOCUMENTS

| | | | | |
|---|---|---|---|---|
| 7,082,359 | B2 * | 7/2006 | Breed | G07C 5/008 701/31.5 |
| 7,403,101 | B2 * | 7/2008 | Kropinski | B60Q 5/006 340/425.5 |
| 9,805,601 | B1 * | 10/2017 | Fields | G08G 1/096791 |
| 2007/0013497 | A1 * | 1/2007 | Watanabe | B60Q 9/008 340/435 |
| 2010/0023207 | A1 * | 1/2010 | Maeda | G07C 5/085 701/33.4 |
| 2015/0070160 | A1 * | 3/2015 | Davidsson | B60W 50/14 340/457 |
| 2015/0254986 | A1 * | 9/2015 | Fairfield | G08G 1/22 707/687 |
| 2017/0186319 | A1 * | 6/2017 | Tsushima | G08G 1/167 |

* cited by examiner

*Primary Examiner* — Thomas Ingram
*Assistant Examiner* — Omar K Morsy
(74) *Attorney, Agent, or Firm* — Womble Bond Dickinson (US) LLP

(57) ABSTRACT

In one embodiment, an intelligent and prompt alarm system is designed on autonomous driving vehicles to help autonomous driving vehicles to communicate to human drivers more vigilantly and promptly, and to improve human driver's performance to take over when an autonomous driving failure occurs. In one embodiment, an alarm system can be developed several levels: 1) basic warning, 2) risk warning, and 3) emergency/take-over alarming.

22 Claims, 12 Drawing Sheets

ALARM SYSTEM OF AUTONOMOUS DRIVING VEHICLES (ADVS)

RELATED APPLICATIONS

This application claims priority of U.S. Provisional Patent Application Ser. No. 62/599,398 filed Dec. 15, 2017 to Jiaming Tao, et al., and entitled, "An Alarm System of Autonomous Driving Vehicles (ADVS)," which is incorporated herein by reference in its entirety to the extent that it is consistent with this disclosure.

TECHNICAL FIELD

Embodiments of the present disclosure relate generally to operating autonomous vehicles. More particularly, embodiments of the disclosure relate to alarm systems for autonomous driving vehicles (ADVs).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

With current autonomous driving technologies, when companies are testing Autonomous Driving Vehicles (ADVs) on public roads, it is still required that a human driver stand by, and quickly take over the control when the ADV is unable to safely navigate the conditions on the road. However, researchers have stated that human drivers are not very prompt at taking over, especially when they are engaged in a non-driving secondary task. Even worse is that most of the time there is really not much time left for the human driver to react and take over when an emergency or autonomous driving failure occurs, and when that happens, it most likely will cause accident or even cost human lives.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, an intelligent and prompt alarm system is designed on autonomous driving vehicles to help autonomous driving vehicles to communicate to human drivers more vigilantly and promptly, and to improve human driver's performance to take over when autonomous driving failure happens. In one embodiment, an alarm system can be developed several levels: 1) basic rule violation warning, 2) risk warning, and 3) emergency/takeover alarming.

Figure 1:
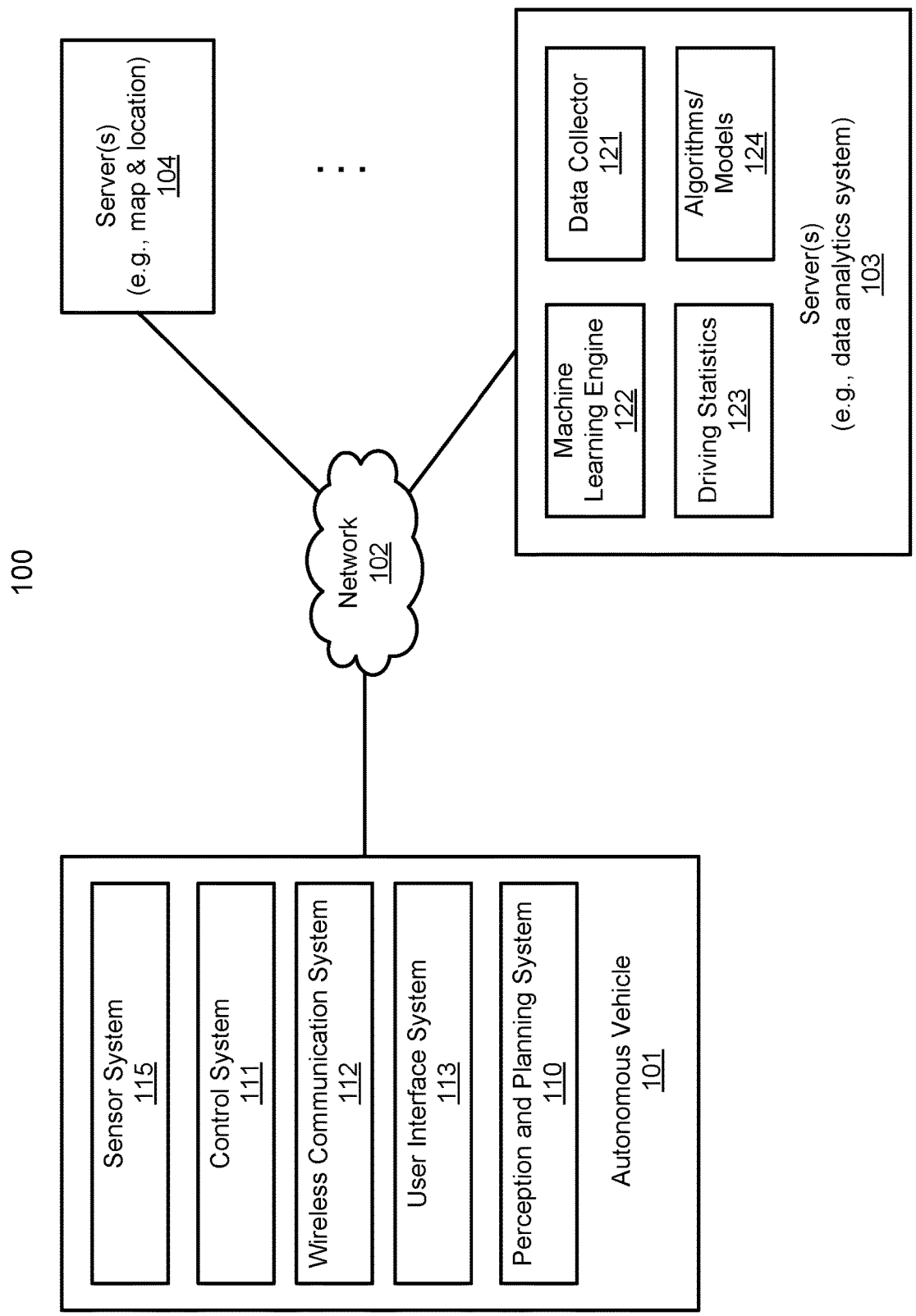
FIG. 1 is a block diagram illustrating a networked system according to one embodiment.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to operate in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
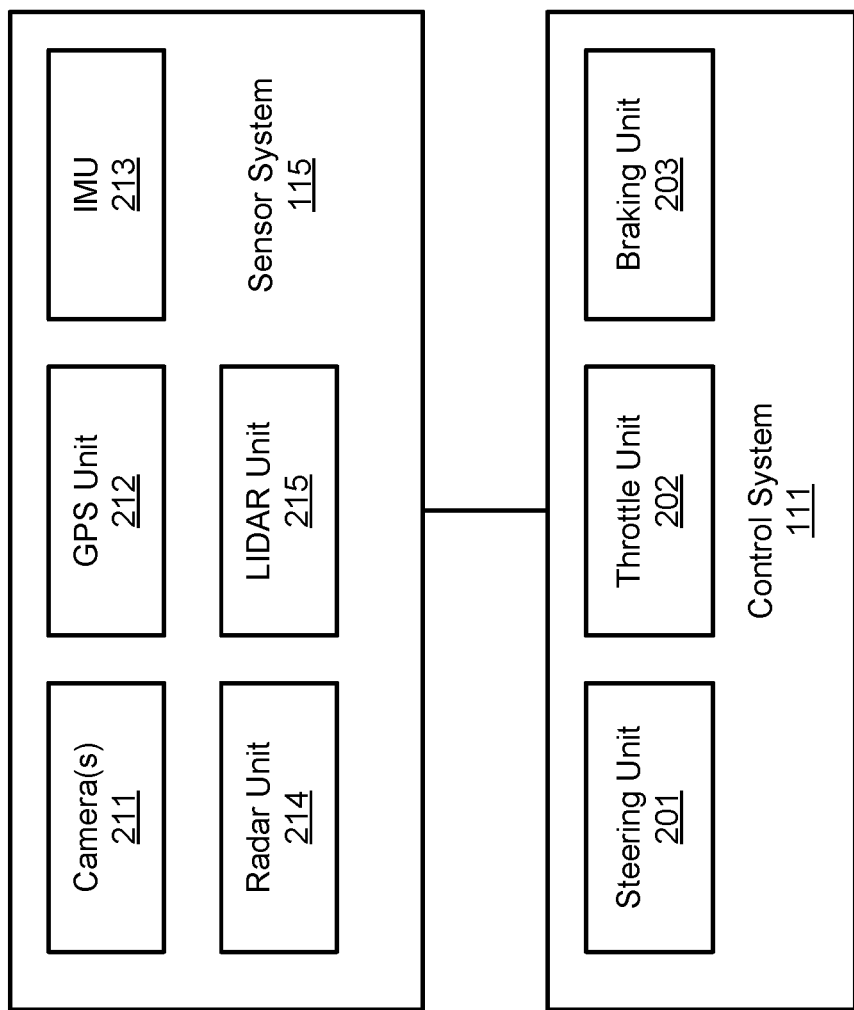
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. Cameras 211 may include an infra-red camera. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

Sensor system 115 can include failure detection logic for each of the sensors in sensor system 115, as described below with reference to FIGS. 3A and 3B.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof. Control system 111 can include logic to detect failure of each control in the control system 111, as described below with reference to FIGS. 3A and 3B.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc. Driving statistics can also include alarm incident reports from a plurality of autonomous vehicles. An alarm is a signal to a human driver of an autonomous vehicle to notify that human driver that she may need to, or must, imminently take over control of the autonomous vehicle. Alarm incident reports record a date and time of an alarm, a level of the alarm, one or more causes of the alarm, driving states of the autonomous vehicle including any or all of speed, heading, tilt, inertial measurement, control inputs such as throttle, braking, and steering, and obstacles perceived by a perception and planning module of the autonomous vehicle. Autonomous vehicle states can also include recording the inputs of a human driver responsive to the alarm state. An alarm incident report may also include an evaluation of the alarm incident by engineers.

Based on driving statistics 123, machine learning engine 122 generates or trains a set of rules, algorithms, and/or predictive models 124 for a variety of purposes, including multi-level alarming algorithms for an alarm system to alarm drivers of the autonomous driving vehicles.

Figure 3A:
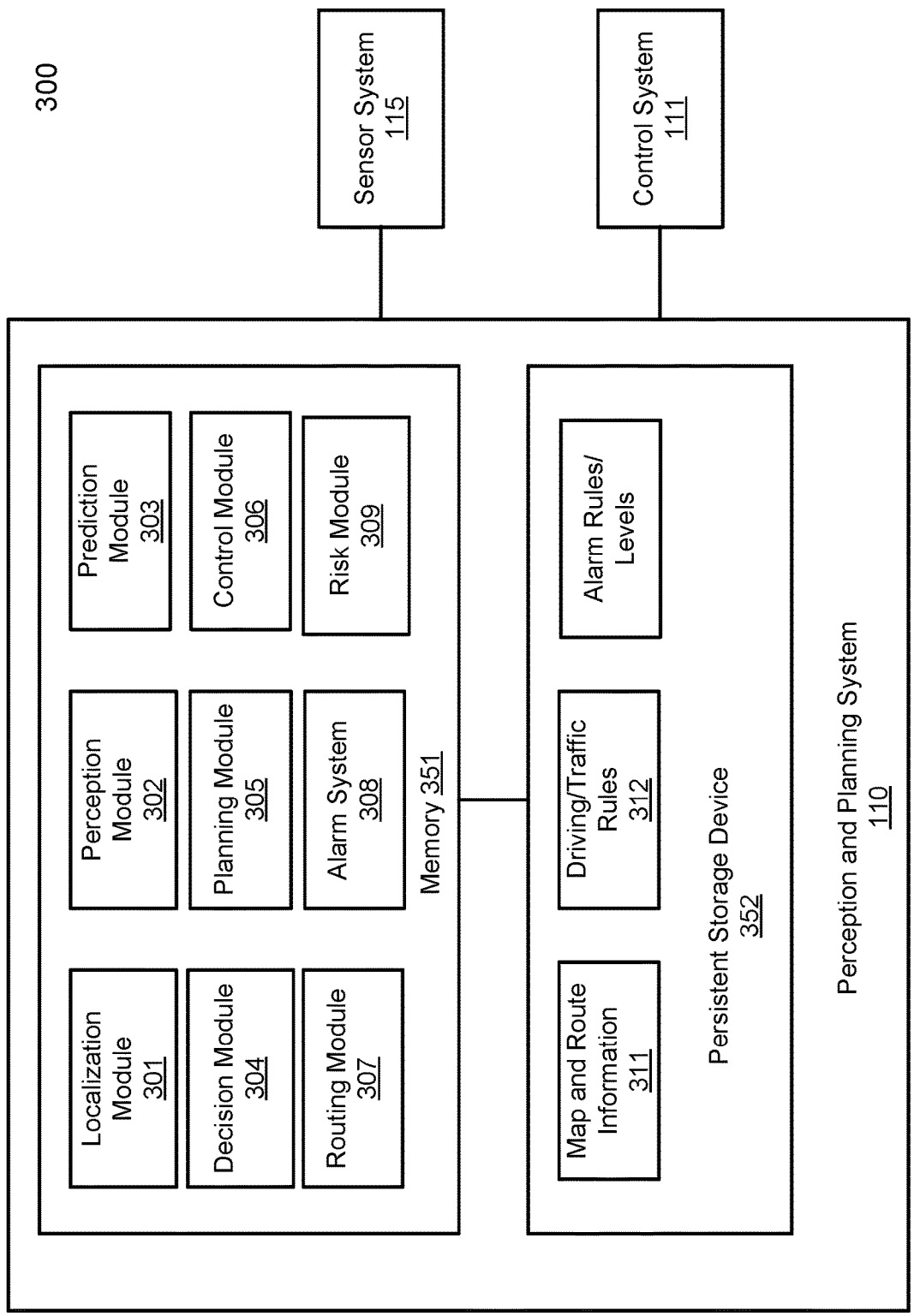
FIGS. 3A-3B are block diagrams illustrating an example of a perception and planning system that includes an alarm system, used with an autonomous vehicle according to one embodiment.
Figure 3B:
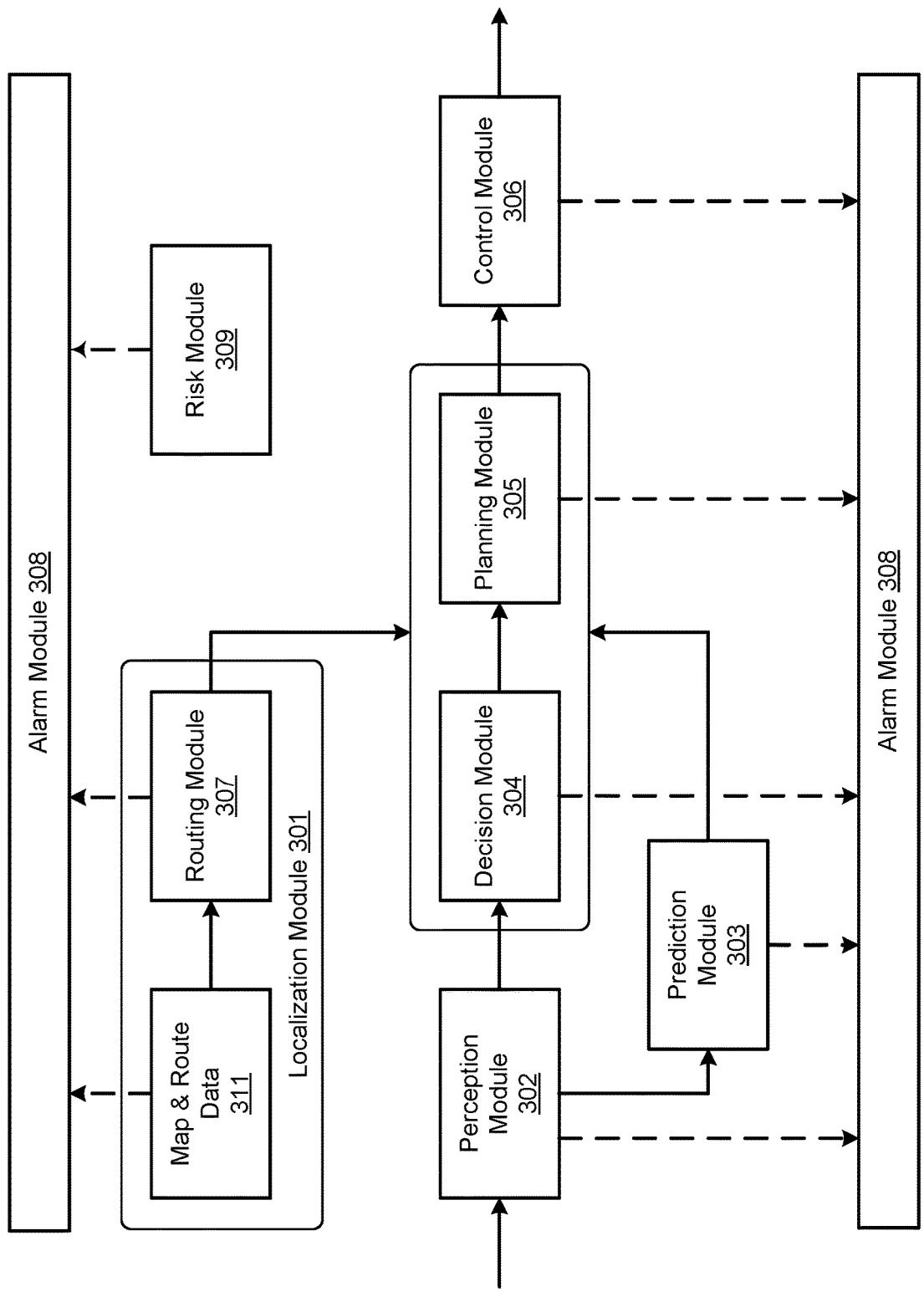

FIGS. 3A and 3B are block diagrams illustrating an example of a perception and planning system that includes an alarm system, used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, alarm system 308, and risk module 309. Localization module 301 can include map and route data 311 and routing module 307.

Some or all of modules 301-309 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-309 may be integrated together as an integrated module.

Localization module 301 determines a current location of autonomous vehicle 300 (e.g., leveraging GPS unit 212) and manages any data related to a trip or route of a user. Localization module 301 may be referred to as a map and route module. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal route in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

In one embodiment, alarm system or module 308 is configured to generate an alarm to notify a human driver of the ADV at multiple levels. The alarm system 308 will monitor the output of all the components in the autonomous driving system, process the status accordingly, and display the alarm result via both visual and sound interface (most importantly sound) to a human driver, as shown in FIG. 3B according to one embodiment.

In one embodiment, perception and planning system 110 can further include a risk module 309. Risk module 309 can be used to detect driving scenarios that may have an elevated risk of injury to persons within the ADV, pedestrians, or an increased risk of an accident occurring. Such driving scenarios can occur even when the ADV operation complies with traffic laws. For example, a posted speed limit may be 25 miles per hour (mph) for a school zone. However, when school has just let out for the day, a great number of children may be adjacent to the roadway near the school. More cars than usual may be parked to pick up children, and may unexpectedly pull away from the curb. Children may emerge from between cars to cross the roadway. A bus may be unexpectedly stopped and double parked in the roadway to pick up or let off children. Risk is further increased when weather affects the road conditions, or the roadway surface is in a poor state of repair. Some states have a traffic law that states, "you must never drive faster than is safe." Such a traffic law calls upon drivers to make a risk judgment as to what is, or is not, safe driving. Risk module 309 performs a risk assessment to determine whether a human driver may be needed to control the ADV in a manner that is safe in view of the obstacles perceived by the ADV perception and planning system 110.

Returning to the alarm system 308, in an embodiment, there can be a plurality of alarm levels each having a different meaning. In an embodiment, each alarm level can have a different alarm sound. In an embodiment, the alarm can be accompanied by a visual and/or audible indication of the alarm. An alarm can have an urgency level. In an embodiment, the urgency level of an alarm can be increased for a particular alarm level in response to detecting one or more of: (1) the alarm level persists longer than a threshold amount of time, a previous alarm level has risen to a next higher alarm level, the human driver has not acknowledged the alarm, or the human driver has not taken control of the ADV, if such control is required. In a non-limiting example system, there can be three (3) levels of alarm. One of skill in the art understands that any number of alarm levels can be used.

When an alarm occurs, alarm system 308 can record the occurrence of the alarm, one or more ADV driving states, and a date-time stamp. In an embodiment, additional metadata can be recorded, such as a current version level and/or build of one or more modules of the ADV control logic. An ADV state can include ADV location information, ADV speed, heading, lateral forces, and incline/decline/flat surface detection. An ADV state can further include control inputs for, e.g., steering input, brake input, and throttle input. In an embodiment, ADV state can further include perception and planning information such as obstacles observed by the ADV, predicted speed and direction of such obstacles, road conditions, such as weather, gravel surface, narrow lanes, and the like.

To minimize delay in issuing an alarm, in an embodiment, an alarm can be issued by an interrupt as soon as the alarm level is detected. In an embodiment, an alarm can be detected by polling each control logic module of the ADV to detect failure of any control logic module and report an alarm.

In an embodiment, alarm system 308 issues only one level of alarm at a time to a human driver. If alarm system 308 detects more than one alarm level at a time, alarm system 308 can issue the highest alarm level of the more than one alarm levels that are occurring at the same time. In an embodiment, a lower level of alarm, e.g. level 1 (basic) alarm level, can escalate into a higher level alarm. Escalation may happen if the lower level alarm conditions persist such that risk to safety of passengers, pedestrians, or risk of an accident has become more likely. Such risk may be assessed by a risk module 309.

Level 1 is a basic rule violation warning. This level of alarm handles very basic checks on very obvious violations without real autonomous driving failure happening yet. The causes can be, for example, straying away from a lane center too much, heading not aligned with the lane, too close to pedestrians, etc.

The goal of this level of alarm is to alert the human driver that she may need to take over control of the ADV. The human driver doesn't have to take over instantly, but can get ready for immediate action when needed. In the meantime, the system can help spot this scenario and automatically save the data at this moment for developers to investigate later. Alarm module 308 can log the occurrence of the alarm Level 2 is referred to as a risk warning level. This level of alarm is issued in response to detecting elevated potential risk without real autonomous driving failure happening yet. The checking criteria to bring up this level of alarm is not as obvious as level 1, and shall be decided by a learning process, and therefore configurable.

The causes for a level 2 risk warning can be, for example, too close to parallel vehicles (the distance varies based on road condition, vehicle speed, etc.), not stopping within certain distance to traffic red light or stop sign (the distance varies based on road type, speed limit, vehicle speed and etc.), or e.g. being too close to pedestrians and/or cars in congested area such as commute traffic or a school zone, wherein the risk of injury or an accident is determined to be elevated.

The goal of this level of alarm is for warning and alerting purposes. The human driver doesn't have to take over instantly, but can get ready for immediate action when needed. In the meanwhile, the system can help spot this scenario and automatically save the data at this moment for developers to investigate later.

Level 3 is referred to as an emergency/take-over alarming. This level of alarm happens when an autonomous driving vehicle is unable to safely navigate the conditions on the road, or any system failure happens from any component, and therefore ADV sends out "emergent-stop" decision to ask human driver to take over instantly. This level of alarm shall apply a different and high volume visual and sound effect, to bring up the most attention of the human driver, to take action immediately.

Perception and planning system 110 can optionally include a risk module 309. Risk module 309 contains logic that determines a risk level of a current driving state of the ADV. The logic can include risk models, generated and trained on a remote server using crowd-sourced ADV alarm incident reports to correlate alarm levels, ADV states, perceived obstacles, and driving outcomes. Models may also be trained with human driver inputs that resulted in safe outcomes according to the crowd-sourced ADV alarm incident reports. Driving outcomes can include determining whether the ADV returned to a safe (non-alarm) state after occurrence of an alarm, or whether the ADV was in an accident, and the results of that accident after occurrence of an alarm. Configuration can include assigning risk values to certain ADV states when assessed with additional information. Detailed examples are discussed below with reference to FIGS. 4A and 4B.

FIG. 3B illustrates interaction of the modules described above with reference to FIG. 3A. Failure of one or more of the modules 301-307 can affect the ability of ADV control logic to safely control the ADV. When the ADV cannot be safely controlled by the ADV control logic, a human backup driver is required and a level 3 alarm is transmitted to alarm module 308.

Localization module 301 is responsible for determining, with high accuracy, a location of the ADV with respect to a high-definition (HD) map of the area surrounding the ADV. Localization module 301 can update the ADVs location using map and route data module 311. Routing module 307 of localization module 301 uses the map and routing information 311 to generate a reference line for navigating the ADV from a start location to a destination location. Routing module 307 then transmits the reference line to the decision module 304 and planning module 305. If map and route data module 311 fails to receive a next portion of a high resolution map, and the ADV is moving, the ADV may be unable to determine its own location in the HR map and on the reference line of the route. An alarm can be generated by localization module 301, map and route data 311 module, or routine module 307.

Perception module 302 uses a plurality of sensors of the sensor system 115 to determine one or more obstacles that are on, or near, the reference line of the ADV, and the location of such obstacles relative to the ADV. Perception module 302 passes the one or more obstacles to the decision module 304 and to the prediction module 303. Prediction module 303 predicts a trajectory for each obstacle. Decision module 304 decides how to handle each obstacle.

Failure by the perception module 302 to detect the presence, or trajectory, of an obstacle or the location of the obstacle can affect the ability of ADV control logic to safely navigate the ADV. Perception module 302 relies on the sensors in sensor system 111. On failure of a sensor, the perception module can generate a level 3 alarm. A non-limiting list of example sensor failure detections includes detecting that a camera 211 has failed to produce an image (no light detected in the image) when other sensors detect an object that the camera should have captured. GPS unit 212 can detect that GPS signal data is not being received from a satellite when a satellite signal is expected, and can be deemed a failure of the GPS unit 212. GPS unit 212 can also detect that the autonomous vehicle is moving, e.g., based IMU 213, radar unit 214, and/or LIDAR unit 215, and that the GPS location is not changing as reported by GPS unit 212, which may be deemed a failure. Localization module 301 can detect that GPS 212 is not providing location information to localization module 301. Inertial measurement unit (IMU) 213 can determine that a non-zero inertial signal should be present when the ADV is moving and has, e.g., 10% or greater steering unit 201 input, but a near-zero inertial signal is reported by IMU 213, which may be deemed a failure of the IMU 213. Radar unit 214 can detect that a signal generator of the radar unit 214 has failed, or that no reflected signal is received when the high definition (HD) map indicates that reflective objects (e.g. buildings or trees) are present, which may be deemed a failure of the radar unit 214. Similarly, LIDAR unit 215 can detect that it has failed to emit a laser pulse, or that no reflected signal is received when the HD map indicates that reflective objects are present, which may be deemed a failure of the LIDAR unit 215. Further, each sensor 211-215 can perform range checking on data received by the sensor to determine whether data returned by the sensor may be deemed invalid. In each of the foregoing sensor failures, perception and planning system 110 may be unable to safely control the ADV, and a level 3 alarm can be generated to the alarm module 308.

Prediction module 303 predicts a trajectory of obstacles detected by, and received from, perception module 302. Prediction module 303 relies on the obstacles and positions of the obstacles received from perception module 302. Prediction module 303 also relies upon computational resources to predict trajectories for the obstacles from a sequence of obstacle locations received from perception module 302. If any of the computing resources has a failure, or a prediction module does not receive an updated list of obstacles and locations at regular intervals, then prediction module 303 may fail to predict the trajectory of one or more obstacles. The control logic may not be able to safely control the ADV navigation with respect to the obstacles, and a level 3 alarm can be generated.

Decision module 304 receives the list of obstacles and locations from perception module 302. Decision module 304 and planning module 305 can also receive trajectories for the obstacles from prediction module 303. If perception module 302 fails to provide a list of obstacles and locations, and/or prediction module 303 fails to provide a trajectory for each obstacle, then decision module 304 may not be able to safely handle each obstacle and a level 3 alarm can be generated.

Planning module 305 plans segments, e.g. 5 second segments, of the ADVs travel along the reference line. These segments take into account the obstacles, their current locations, and their trajectories, in making a routing decisions for a segment. Without an accurate list of obstacles, locations and their trajectories, a safe segment of ADV travel may not be able to be generated, and a level 3 alarm can be generated.

Control module 306 receives the segment of travel from the planning module 305 and determines steering, braking, and throttling inputs to generate so that the ADV will follow the received segment. If the control module 306 does not receive a segment from the planning module, or one or more control systems experience a failure, then a level 3 alarm may be generated. Control module 306 can detect that there is a steering input value, e.g. greater than 10%, and the ADV is moving, and localization module 301 indicates that ADV is continuing in a straight line, indicating that the steering input is not taking effect in control system. Throttle unit 202 can detect that there is a throttle input value, e.g. greater than 10%, and the ADV transmission is in gear, the braking input is approximately zero, and tilt sensors indicate that the ADV is facing downhill or is on the flat, but the ADV is not moving forward. This may indicate that the ADV control input signal to the throttle input is not working. Similarly, braking unit 203 can detect a braking input value, e.g. greater than 10%, that the throttle input value is approximately zero, and inclination sensors can indicate that the vehicle is parked on a flat, or uphill surface, but the ADV is not slowing down. This may indicate that the ADV control input signal to the braking unit 203 is not working. Under each of these control unit failure modes, a level 3 alarm may be generated to the alarm module 308.

Risk module 309 can utilize all subsystems of the ADV, and trained ADV alarm incident models to perform a risk assessment value for an ADV driving state. Risk models can be trained to correlate variables such as ADV speed, proximity of the ADV to pedestrians and other vehicles, speed limit, and road conditions, e.g. weather, gravel surface, potholes, etc. to a risk value. Each alarm that is generated by an ADV is recorded, along with ADV state information, including time of day, ADV location, heading, speed, sensor readings, and HD map information. For the duration that the alarm state persists, ADV state information is recorded, along with any human driver inputs that may be received. At the end of an alarm state, an assessment is made whether the alarm state ended safely, or whether an injury or accident occurred. Such assessment can include a combination of analysis of stored records by a remote server, and optionally an analysis by engineers or other professionals. The assessed recorded data is uploaded to the remote server for a large plurality of ADVs. The remote server can train risk models based on the alarm incident reports. A risk assessment value is a number that represents a probability of unsafe navigation of the ADV, and optionally an estimated severity of outcome with the risk. For example, if an ADV is driving at the posted speed limit, and the road is narrow and wet, on a school day and at a time when school has just let out, then a safe speed may be much lower than the posted speed limit, and a safe distance from obstacles such as cars and pedestrians may be much greater than on a dry, weekend day, with no school, few pedestrians, and wide roadways with no cars parked along the roadway. Examples of risk assessment are described below with reference to FIGS. 4A and 4B.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 4A:
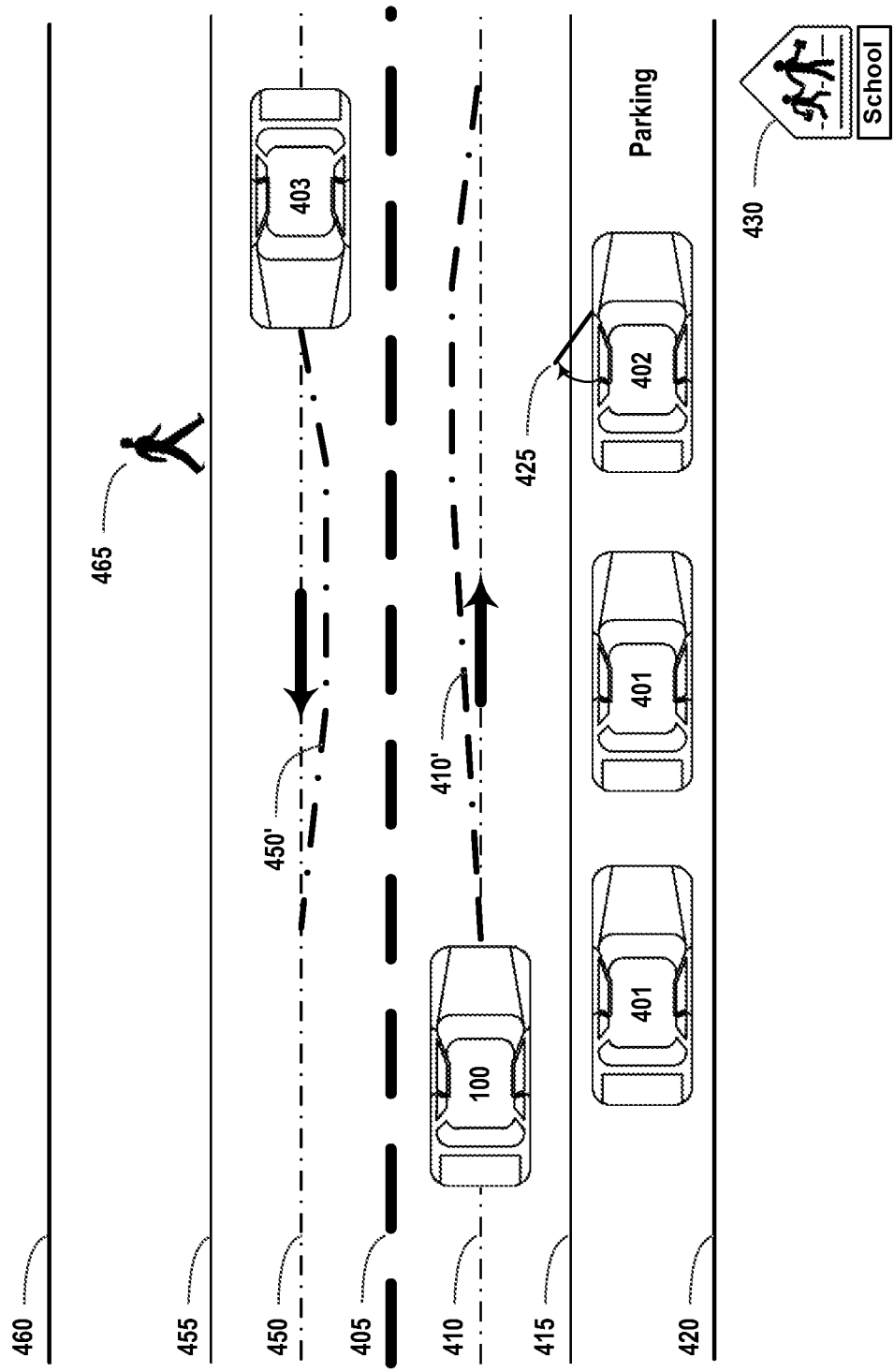
FIGS. 4A-4B are block diagrams illustrating examples driving scenarios that can invoke use of an alarm system of an autonomous driving vehicle according to one embodiment.
Figure 4B:
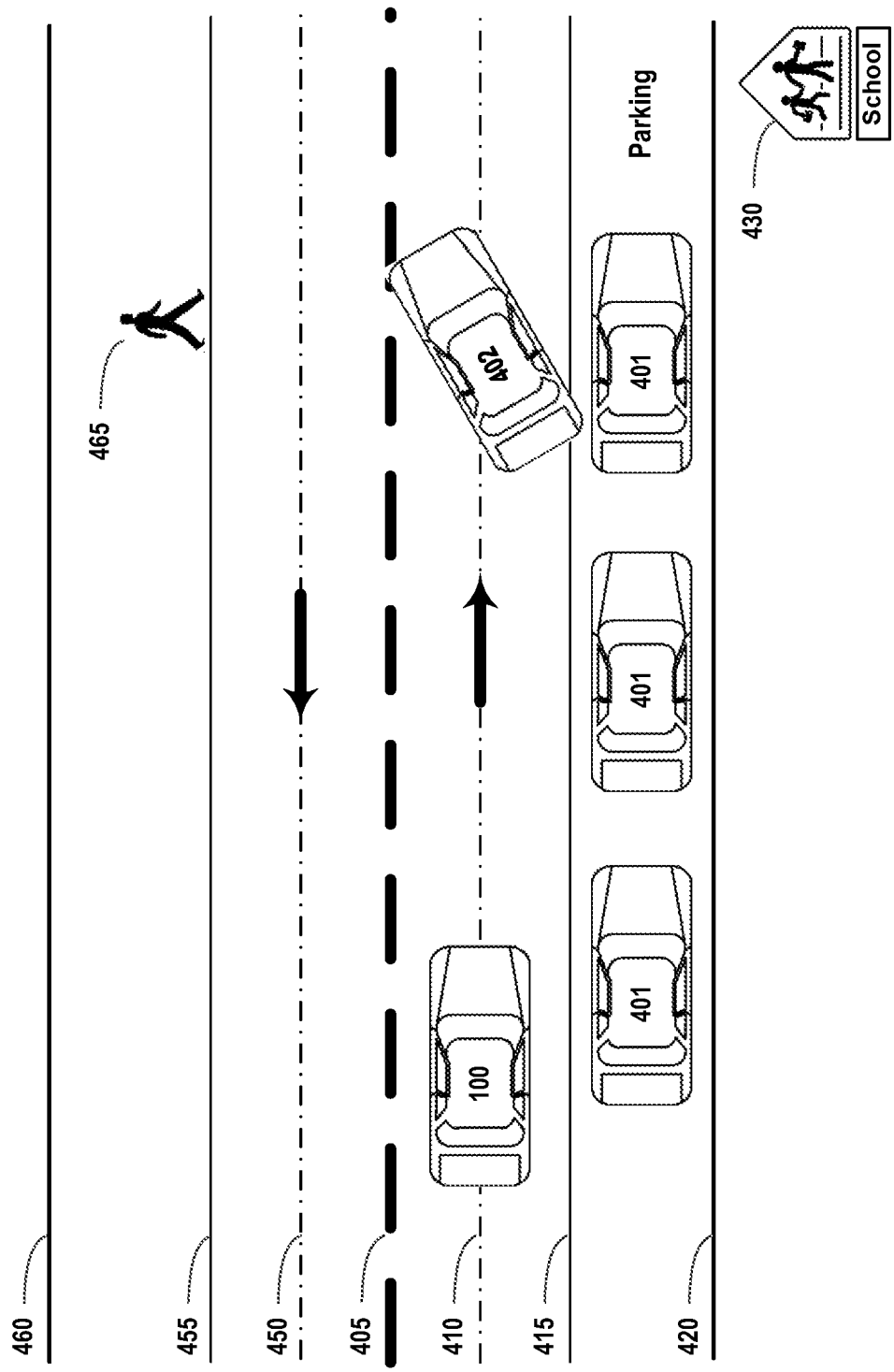

FIGS. 4A and 4B are block diagrams illustrating examples driving scenarios that can invoke use of an alarm system of an autonomous driving vehicle according to one embodiment.

A roadway may have a center line 405, indicated in FIG. 4A as a bold dashed line. In FIG. 4A, the roadway has two directions, separated only by the center line 405. An ADV 100 can have a navigation reference line, e.g. 410. For ADV 100, the driving portion of the roadway is indicated by center line 405 and roadway edge line 415. Roadway edge line 415 may, or may not, be painted on the roadway. Roadway edge line 415 can be generated for the ADV 100 as a safe distance reference that the ADV 100 uses to delineate the roadway. One or more cars 401 and 402 may be parked along the roadway, beyond roadway edge line 415. To the right of the parked cars, curb line 420 indicates an edge of the roadway, e.g. a paved surface, and the beginning of non-roadway space, such as a sidewalk, lawn, or other non-roadway surface. In FIG. 4A, a warning sign 430 indicates that the area is a "school zone." A school zone is an area near a school. The sign warns drivers that there may be driving conditions common to a school such as: numerous children, drivers who are parked to pick up their children and who may pull away unexpectedly from the curb. Such drivers may be distracted by any number of things, including their children. Thus, although a posted speed limit may state, e.g., 25 mph, that speed may be far too fast for the school zone conditions, especially when school has just let out. To safely navigate the ADV 100 through the school zone, ADV 100 control logic must take numerous variables and risk conditions into account.

On the opposing side of the roadway, a car 403 may be traveling on a trajectory 450. Car 403 may have a human driver or be and ADV such as ADV 100. A driving lane of the opposing side of the roadway is delineated by center line 405 and roadway edge 455. Roadway edge 455 may be a painted line on the roadway surface or may be an imagined line. Curb edge 460 delineates an edge of the roadway surface for the opposing side of the roadway. In an embodiment, lines 455 and 460 could delineate a bicycle lane that forms a part of the opposing side of the roadway. A pedestrian 465 may be walking adjacent to the opposing side roadway edge line 455.

In an example of a level 1 alarm, ADV 100 is traveling along the reference line 410. Cars 401, 401, and 402 are parked between roadway edge 415 and curb edge 420. ADV 100 detects the school zone warning sign, implying that a slower speed and/or greater distance than usual from objects perceived by perception module 302 may be needed to safely navigate the ADV 100 through the school zone. In particular, cars may pull out suddenly from the curb, pedestrian children may appear suddenly from between parked cars, and sensor detection of small children may be obstructed by the parked cars 401, 401, and 402. In this example, car 403 is present and traveling on line 450. The pedestrian 465 is not present. No alarm state exists yet. ADV 100 detects that parked car 402 opens its driver side car door 425 and that the open car door 425 crosses the roadway edge line 415. ADV 100 decision module 304 decides that veering slightly left, off of the reference line 410 and onto segment line 410', will safely avoid the open car door 425 and safely avoid the oncoming car 403. ADV 100 generates a level 1 alarm because a distance between car 403, which is traveling toward ADV 100 on line 450, may be less than a minimum threshold distance from ADV 100 at the time that ADV 100 veers slightly left onto segment line 410' to avoid the open car door 425 of parked car 402. The minimum distance threshold is such that a human driver should be alerted to be ready to take over the ADV 100 control, if necessary. But, in this example, the level 1 alarm only alerts that human driver to be ready.

In an example of a level 2 alarm, car 403 is present in the opposing side of the roadway, and pedestrian 465 is present, walking along the opposing roadway edge 455, which bounds one side of the opposing side roadway. The conditions of example 1 are all present: car 402 opens its door 425, ADV 100 veers slightly left onto segment line 410', toward center line 405. In this example, car 403 is traveling on line 450, but veers slightly toward center line 405, onto trajectory line 450', to avoid pedestrian 465. ADV 100 detects the trajectory of obstacle car 403 onto line 450'. ADV 100 and car 403 will pass each other, in opposing directions, at approximately the location of the open car door 425 of parked car 402. ADV 100 risk module 309 detects that, while the two vehicles likely will not collide, the minimum distance between ADV 100 and car 403 at the point of their passing each other will be below a minimum distance and that the fact that ADV 100 and car 403 are traveling in opposing directions means that if an accident does occur, the differential speed between the ADV 100 and car 403 will be high. Therefore, a risk module 309 may generate a risk value indicating that a level 2 alarm needs to be issued so that the human driver can imminently take over to safely navigate the ADV 100 past car 403, open door 425 of car 402, and through the school zone. The presence of the school zone is a risk factor that risk module 309 takes into account.

In FIG. 4B, an example of a level 3 alarm is described. The roadway lines 405, 410, 420, 450, 455, and 460 are the same as in FIG. 4A. ADV 100 is driving through a school zone as indicated by warning sign 430. Cars 401 are parked between the roadway edge 415 and curb edge 420. A pedestrian 465 is walking along the opposing roadway edge, adjacent to the driving lane bounded by center line 405 and opposing roadway edge 455. The opposing lane is the opposing driving direction as the lane of ADV 100. In this example, car 402 is stopped in an irregular manner, completely blocking the lane of ADV 100. ADV 100 detects the obstacles 402 and 465 and computes a trajectory segment 410' (not shown) to pass the stopped car 402 blocking ADV 100's lane. ADV 100 determines that it likely cannot safely stop in ADV 100's own lane that is blocked by car 402. ADV 100 determines that it may not be safe to cross into the oncoming lane of traffic on the opposing side of the roadway. ADV 100 further determines that there is no safe stopping location on the right, because of the parked cars 401. ADV 100 determines that passing the stopped car 402, requires navigating into coming traffic. ADV 100 may have a rule against passing an obstacle into oncoming traffic. ADV 100 also determines that passing stopped car 402 may require accelerating to a speed that is too great for the school zone. Passing the car 402 may also take the ADV 100 too close to the pedestrian 465 while ADV 100 is accelerating past car 402. ADV 100 raises a level 3 alarm to indicate that the human driver should take over immediately to ensure safety of passengers of the ADV 100, pedestrians, and to avoid an accident. The human driver inputs are recorded during the navigation past car 402. When the alarm state is cleared, either manually or by the conditions causing the alarm to cease to exist, ADV 100 can transmit an alarm incident report to remote server for analysis and machine learning.

Figure 5:
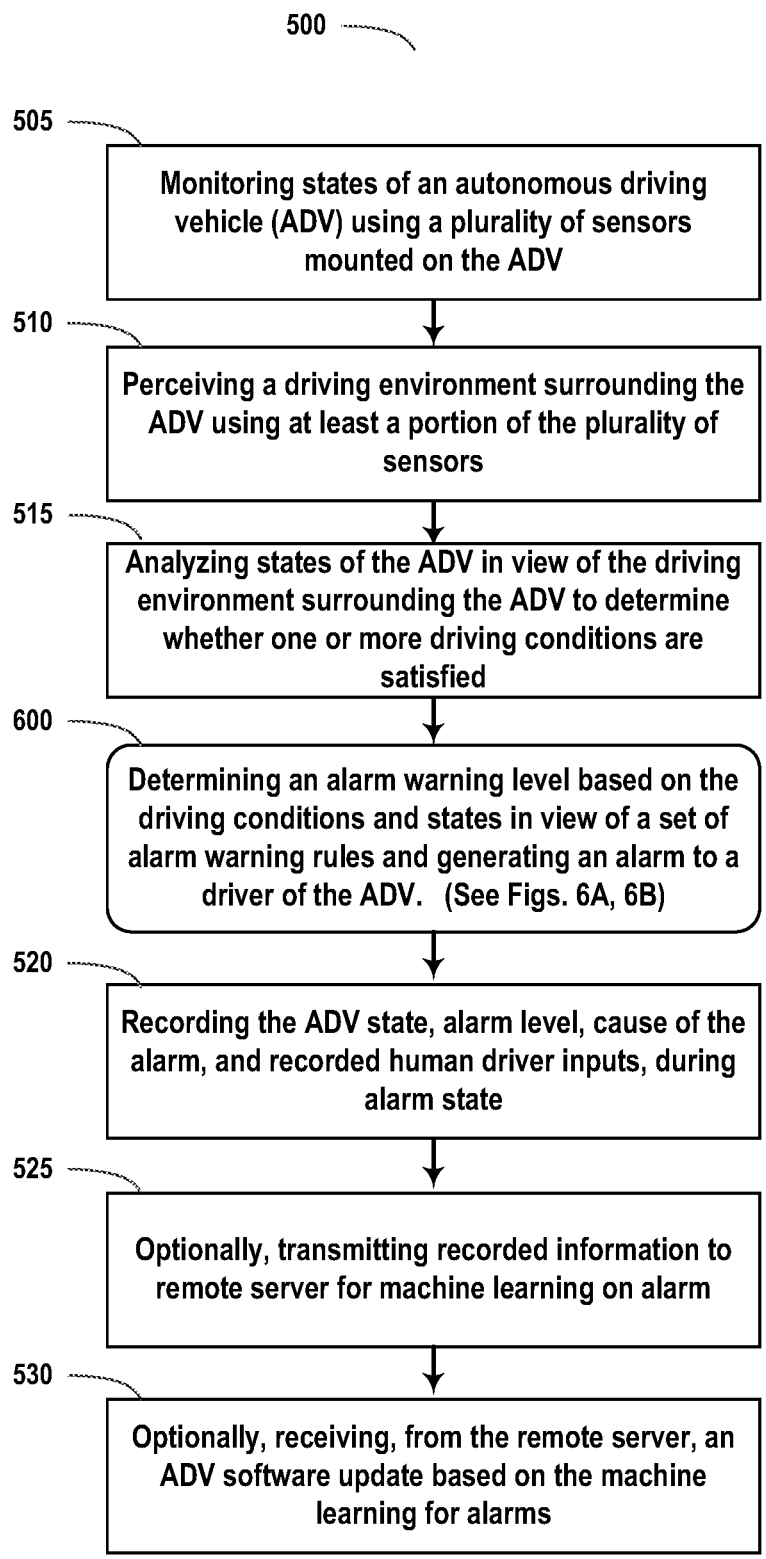
FIG. 5 is a block diagram illustrating a method of implementing an alarm system of an autonomous driving vehicle according to one embodiment.

FIG. 5 is a block diagram illustrating a method 500 of implementing an alarm system of an autonomous driving vehicle (ADV) according to one embodiment.

In operation 505, ADV 100 can monitor states of the ADV using a plurality of sensors mounted on the ADV. As described above, sensors can include the sensors in sensor system 115, such as camera 211, GPS unit 212, IMU 13, radar unit 214, and LIDAR unit 215. ADV 100 can also monitor control inputs in control system 111, such as steering unit 201 inputs, throttle unit 202 inputs, and braking unit 203 inputs. A state of the ADV is characterized by any or all of: ADV speed, heading, lateral force, adherence to a navigation reference line, compliance with traffic laws, an alarm state, a risk assessment value, control input values for braking, throttle, and steering, location of the ADV in a high definition map, and distance to one or more obstacles surrounding the ADV 100.

In operation 510, ADV 100 can perceive a driving environment surrounding the ADV using at least a portion of the plurality of sensors and logic modules that process the sensor data. Logic modules can include localization module 301 that uses a high definition (HD) map and position sensors, such as camera(s) 211, GPS unit 212, IMU 213, radar unit 214, and LIDAR unit 214, to determine a location of the ADV 100. Logic modules can further include a perception module 302 that uses the sensor data to detect obstacles on the roadway and a location of the obstacles, a prediction module 303 that predicts a trajectory of the obstacles, a decision module 304 that determines how to handle each obstacle, and a planning module 305 that determines each segment of travel of the ADV 100, in view of a reference line for the travel trip, the obstacles and their locations and trajectories. The driving environment surrounding the ADV includes one or more obstacles surrounding the ADV 100, each having a location and a trajectory, perceived traffic and warning signs, traffic lights, and the ADV's location within the driving environment.

In operation 515, ADV 100 can analyze the states of the ADV in view of the driving environment surrounding the ADV 100 to determine whether one or more driving conditions are satisfied. Driving conditions can include, but are not limited to, ensuring that the ADV navigates in compliance with applicable traffic laws, navigates within a threshold distance and heading of the navigation reference line, ensuring that the ADV maintains at least a minimum threshold distance away from obstacles, and ensuring that navigation of the ADV maintains passenger comfort. Passenger comfort can include minimizing lateral forces due to ADV speed in relation to steering input, rearward forces due to fast acceleration, forward forces due to fast deceleration, sudden jolts from potholes, collisions, and the like. Minimum distances from obstacles are configurable and can vary depending upon whether the obstacle is moving, whether the obstacle is a car traveling in the same direction as the ADV (therefore, having a small differential speed between the ADV and car) or opposing directions (therefore, having a large differential speed between the ADV and car), whether the obstacle is a pedestrian, and whether the ADV is complying with traffic laws to maintain minimum distance from, e.g. a car in front of the ADV, a pedestrian, or a bicyclist surrounding the ADV.

In operation 600, ADV 100 alarm system 308 can determine an alarm level, if any, based upon the driving conditions and states in view of the set of alarm warning rules. ADV alarm system 308 can also determine an alarm level based upon sensor failures and/or subsystem failures of the ADV navigation logic. Operation 600 can further include generating an alarm to the human driver of the ADV. Determining an alarm level and generating an alarm to the human driver of the ADV are described below with reference to FIGS. 6A and 6B.

In operation 520, the ADV 100 can record the alarm level and one or more ADV states, including human driver inputs during the alarm level. ADV states can include the ADV's location, heading, speed, adherence to, or deviation from, the navigation reference line, and perceived obstacles, their locations and trajectories during the alarm. ADV states can also include control inputs such as throttle input, steering input, and braking input.

In operation 525, ADV 100 can optionally transmit an alarm incident report containing all of the recorded information for an alarm to a remote server for machine learning on the alarm, and the outcome of the alarm.

In operation 530, ADV 100 can optionally receive, from the remote server, an ADV software update based on the remote server performing machine learning on ADV alarm incident reports from a large plurality of ADVs. In an embodiment, ADV 100 can receive notice that an ADV software update is available and ADV can download the software update at a later time.

Figure 6A:
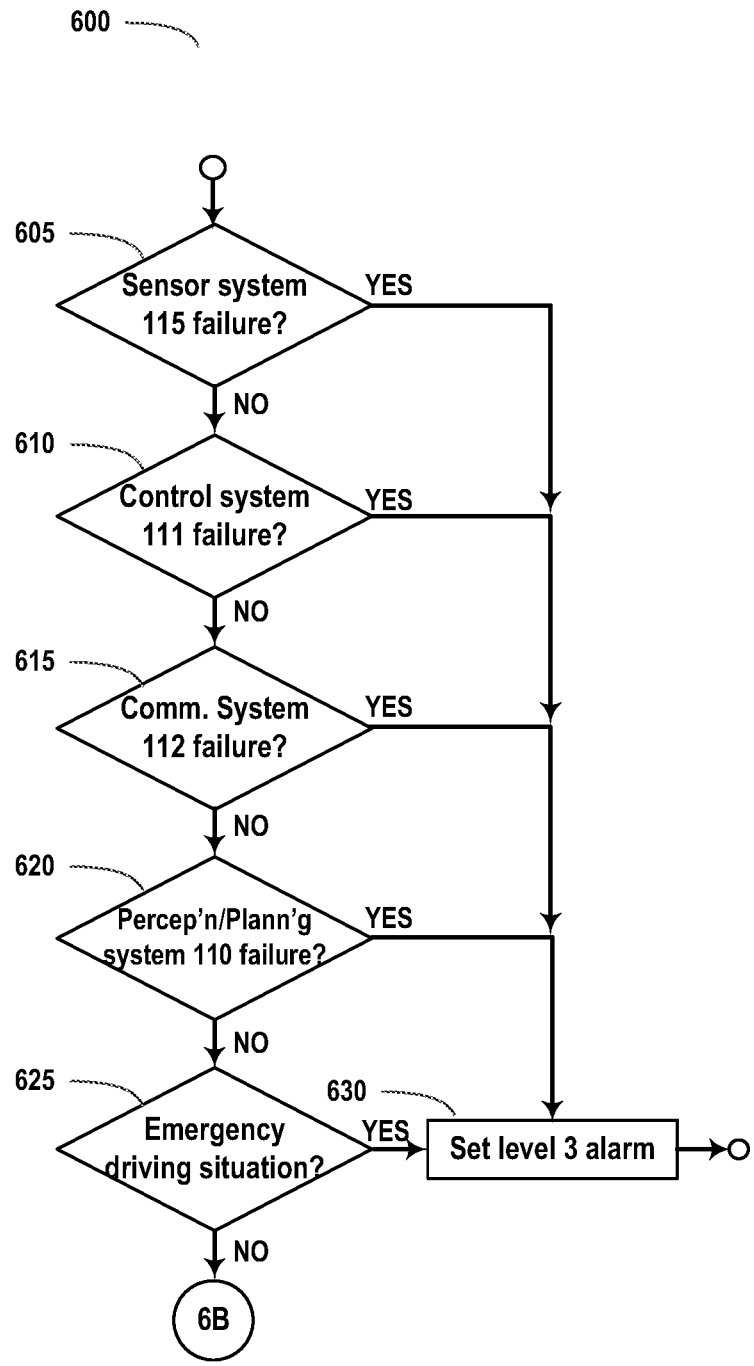
FIGS. 6A-6B are block diagrams illustrating a method of generating an alarm in an autonomous driving vehicle according to one embodiment.
Figure 6B:
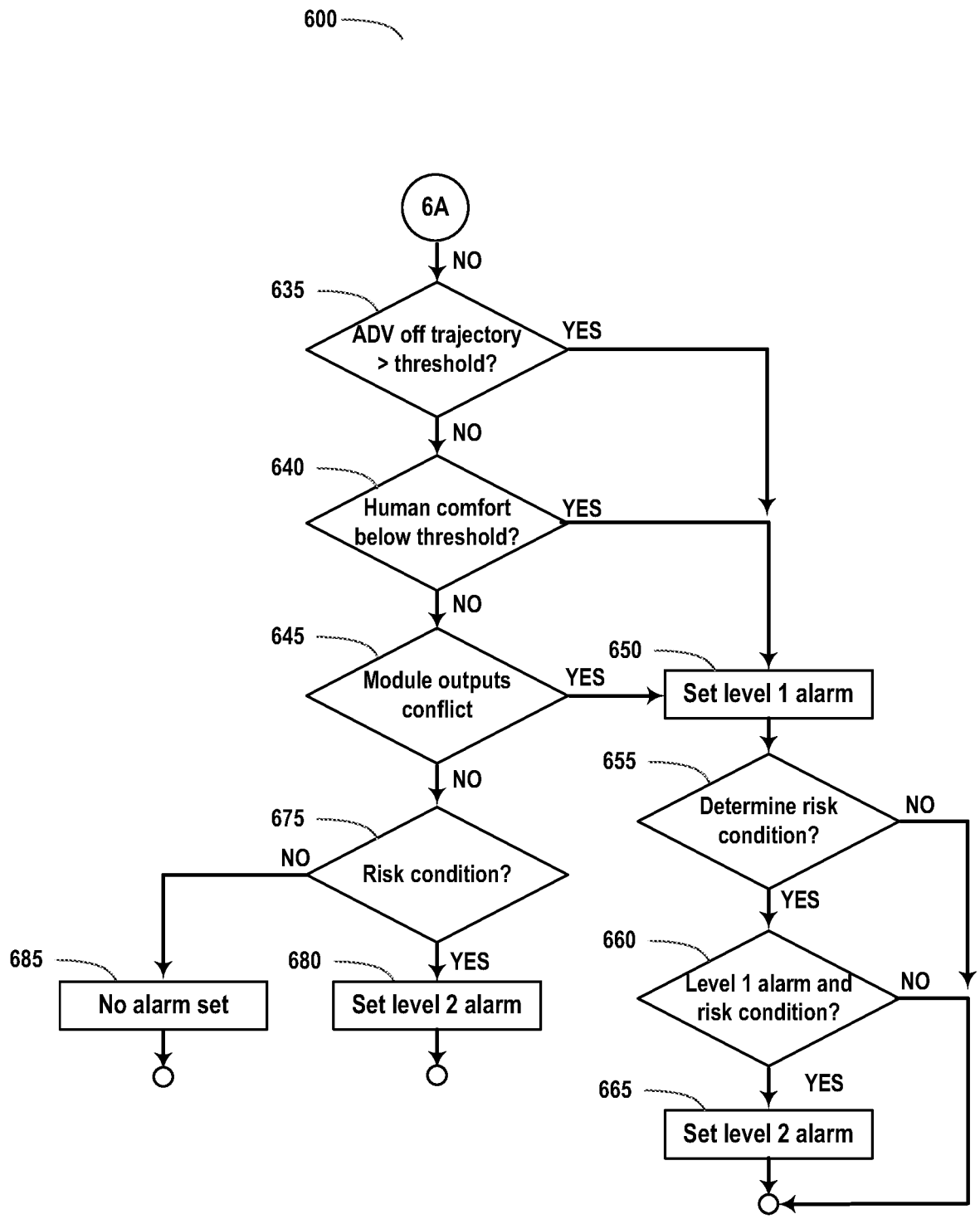

FIGS. 6A and 6B are block diagrams illustrating a method 600 of detecting and generating an alarm in an autonomous driving vehicle according to one embodiment.

In operation 605, sensor system 115 can determine whether one or more sensors of sensor system 115 have failed. For example, camera 211 can determine whether camera has failed to capture a valid image, which may be deemed a failure of the camera 211. A valid image has sufficient clarity and content to at least partially identify objects in the field of the camera lens. GPS unit 212 may fail to maintain communication with a satellite, may fail to receive satellite information, or may receive invalid location information. GPS location information may be invalid if the location information is inconsistent with previously received location information or other sensors of the ADV. IMU 213 may fail to detect inertial movement of a type and magnitude consistent with operation of the ADV 100. IMU 213 may indicate no lateral force at all, or indicate lateral force in a direction that is inconsistent with the ADV navigation. For example, IMU 213 should detect lateral force that is opposing to the direction that the ADV is turning. A failure of the IMU 213 may occur when IMU 213 detects left lateral force when the ADV is turning left, or right lateral force when the ADV is turning right. Radar unit 214 may fail to emit a radio pulse or fail to receive reflected information when LIDAR unit 215 and/or HD map indicate that there are reflective surfaces present, such as buildings or trees. Similarly, LIDAR unit 215 may fail to emit a laser pulse or fail to detect reflected information when the radar unit 214 and/or HD map indicate that there are reflective surfaces present, such as buildings or trees. If any such failure is detected in the sensor system 115, then method 600 continues at operation 630, otherwise method 600 continues at operation 610.

In operation 610, ADV 100 control module 306 can determine whether a failure has occurred in control system 111. A steering unit 201 failure may be detected when there is a steering input issued by control module 306, but localization module 301 indicates one or more locations that are inconsistent with the steering input. A throttle unit 202 failure may be detected when there is a throttle input issued by control module 306, there is no braking unit 203 input issued by control module 306, sensor system 115 indicates that the ADV is not faced uphill, and localization module 301 does not detect a change in location of the ADV that is consistent with the throttle input. A braking unit 203 failure may be detected when there is a braking input issued by control module 306, ADV sensors indicate that the ADV is on a flat roadway or is facing uphill, there is no throttle input, and the ADV fails to decelerate in accordance with the braking input. If a control system 11 failure is detected, the method 600 continues at operation 630, otherwise method 600 continues at operation 615.

In operation 615, it can be determined whether a communication system 112 failure has occurred. A communications failure may be detected when communication system 112 has transmitted a message that requires a response, and no response has been received within a threshold period of time. A communications failure may be detected when a format or content of data received by communication system 112 is different than format or content if data expected in a received message. A communications failure may also be detected when a message is expected to be received by communications system 112 at a regular interval, and no such message has been received. A communications system 112 may also include a low-level "keep alive" signal to each subsystem of ADV control logic. A keep alive signal is used to detect whether a module or subsystem is responsive, i.e. "alive." If communications system 112 emits a keep alive signal to a subsystem, and the subsystem fails to respond to the keep alive signal within a threshold period of time, then the subsystem may be deemed in a failure state. If communications system 112 detects any of the failures described in operation 615, then method 600 continues at operation 630, otherwise method 600 continues at operation 620.

In operation 620, it can be determined whether perception and planning system 110 has failed. Perception and planning system 110 can fail when any module within perception and planning module 110 has failed. Perception and planning module 110 includes localization module 301, perception module 302, prediction module 303, decision module 304, planning module 305, control module 306, routing module 307, alarm system 308, and risk module 309. As described above, localization module 301 determines a location of the ADV within a HD map using sensor system 115 and map and route data 311. Routing module 307 determines a reference line of navigation for the ADV from a starting point to an ending point of a trip. Localization module 301 can be deemed to have failed when the location of the ADV within the HD map cannot be determined. Thus, localization module 301 can fail when any of sensor system 115 subsystems fail. Localization module 301 can fail when communication with an HD map server is lost and/or the HD map data is in an incorrect format, or is inconsistent with previously received HD map data. Perception module 302 detects one or more obstacles surrounding ADV 100. A failure of perception module 302 can occur when perception module 302 fails to perceive obstacles surrounding that ADV when at least some such obstacles surrounding the ADV are indicated within the HD map, such as buildings, trees, and other persistent objects. Prediction module 303 predicts the trajectory of one or more obstacles detected by perception module 302. A failure of prediction module 303 can occur when prediction module 303 predicts a trajectory (movement) for an immovable object, such as a building, or when prediction module 303 predicts a trajectory for a movable object that is inconsistent with the nature of the object, such as a pedestrian or bicyclist having a trajectory that is 25 feet above ground and traveling at 60 mph. Such failures can be detected by comparing obstacle types with properties associated with obstacles having the type. Decision module 304 decides how to respond to each obstacle detected by perception module 302 taking into account the trajectory of each obstacle as determined by prediction module 303. A failure of decision module 304 can be detected when the decision on how to handle an obstacle is inconsistent with the type of obstacle, or is inconsistent with operation of the ADV. For example, perception module 302 may detect a tree as an obstacle and prediction module 303 may generate a trajectory for the tree indicating that the tree is moving at 5 mph toward the ADV, which can be determined to be a failure. A failure of decision module 304 can be detected when decision module 304 produces an illogical result, such as accelerating toward a pedestrian, or other behavior that may harm one or more persons. Routing module 305 decides a route segment for, e.g., the next 5 seconds of driving along the reference line. A failure of routing module 305 can include failing to output a next route segment before a previous route segment has been completed, or choosing a route that increases risk and decreases safety. Control module 306 provides inputs to control system 111 for throttle, steering, and braking. A failure of control module 306 can include issuing contradictory inputs, such as suddenly increasing the steering input hard to the left when there is no obstacle to avoid by using such an input, increasing throttle input when a red light or stop sign is detected in front of the ADV, or suddenly applying both brake and throttle to a high amount. Routing module 307 determines a reference line for navigation from a starting point to an ending point of a trip. A failure of routing module 307 can include failure to output a reference line for the ADV to navigate by, outputting a reference line that includes immovable objects, such as buildings or trees, outputting a reference line that includes driving in the opposing direction of the lane direction for the roadway, or generating a reference line that does not comply with driving laws or safe driving practices. Alarm system 308 detects and issues an alarm state to a human driver in the ADV and records information related to the alarm issued. Failure of the alarm system 308 can include failure to issue a detected alarm, failure to record information related to the alarm, failure to end an alarm state after either the human driver, or driving conditions, indicate that the alarm state has ended. Risk module 309 detects driving conditions that constitute an elevated risk of injury to a person or property, and may also include estimating a related elevated discomfort level for passengers. Failure of risk module 309 can include failure to output a risk assessment value when called upon to determine a risk assessment value, or failure to apply one or more configurable risk assessment rules in determining a risk assessment value. The above examples of failure of components or modules of the perception and planning system 110 are non-limiting. In operation 620, if any of the above failures of a component or module occurs, then method 600 continues at operation 630, otherwise method 600 continues at operation 625.

In operation 625, it can be determined whether there is an emergency driving situation wherein a human driver needs to take over control of the ADV immediately. An emergency driving situation can occur when the ADV control logic determines that the ADV control logic cannot safely navigate the ADV without human driver input, such as when an obstacle cannot be safely avoided, or the ADV cannot stop in time for a red light or stop sign. In an embodiment, an emergency driving situation can occur when the risk module 309 outputs a risk assessment value above a threshold value, such as 0.70 (70%) chance of injury or property damage occurring. If an emergency driving situation is detected, then method 600 continues at operation 630, otherwise method 600 continues at operation 635. Operation 635 is described below with reference to FIG. 6B.

In operation 630, alarm module 308 sets a level 3 alarm and exits method 600.

Referring now to FIG. 6B, in operation 635, planning module 305 can determine whether the current route segment indicates that the ADV is off the navigation reference line for the trip by more than a threshold amount. An example is shown in FIG. 4A, above, wherein the planning module 305 determines route segment 410' to avoid an opening car door 425 of a parked car 402, wherein the open door encroaches on roadway edge line 415. If the actual location of the ADV, when following route segment 410', is too far off line 410', then method 600 continues at operation 650. Otherwise, method 600 continues at operation 640.

In operation 640, inertial measure unit (IMU) 213 can determine whether lateral forces of the ADV 100 exceed a threshold amount, which indicates that a comfort level for passengers of the ADV may be below a threshold value. Similarly, if forward and rearward sensors indicate that the ADV is braking or accelerating too sharply, then human comfort may be reduced below a threshold value. Human comfort may also fall below a threshold value when the ADV is navigating less than a threshold distance from obstacles. Rules for distance and speed can be configured for passenger comfort. If human comfort is determined to be below a threshold value, then method 600 continues at operation 650. Otherwise method 600 continues at operation 645.

In operation 645, it can be determined whether ADV navigation module outputs conflict. For example, decision module 304 may be unable to determine an ADV navigation path that is simultaneously a desired distance away from a first obstacle and a desired distance away from a second obstacle. The desired distance is a configurable ideal minimum distance, but does not necessarily indicate an immediate risk of injury or property damage. If module outputs conflict, then method 600 continues at operation 650. Otherwise method 600 continues at operation 675.

At operation 650, a level 1 alarm is set. Method 600 continues at operation 655.

At operation 655, a decision is made whether to perform a risk assessment. A risk assessment by risk module 309 can be computationally expensive, and may not be performed for all level 1 alarms. ADV alarm module 308 can use models trained by a remote server using crowd-sourced ADV alarm incident reports to determine whether the cause of a level 1 alarm (e.g. decisions 635, 640, or 645) warrants computing a risk assessment. A risk assessment may be computed when a same level 1 alarm has persisted, and driving conditions have changed, e.g. the ADV is now closer to an obstacle than when the level 1 alarm was originally issued. If a risk assessment is to be performed, then method 600 continues at operation 660. Otherwise method 600 ends.

In operation 660, a risk assessment can be made of the ADV driving state, and it can be determined whether the risk assessment is above a threshold value, while a level 1 alarm state is set. If the risk assessment value is greater than the threshold for a level 2 alarm, then method 600 continues at operation 665. Otherwise, method 600 ends.

In operation 665, a level 2 alarm is set and method 600 ends.

As described above, operation 675 is reached when none of the level 3 alarm or level 1 alarm conditions are present. In operation 675, it can be determined whether a risk assessment value is greater than a threshold value for a level 2 alarm. If so, then in operation 680 a level 2 alarm is set, otherwise in operation 685 no alarm state is set. Method 600 ends.

Figure 7:
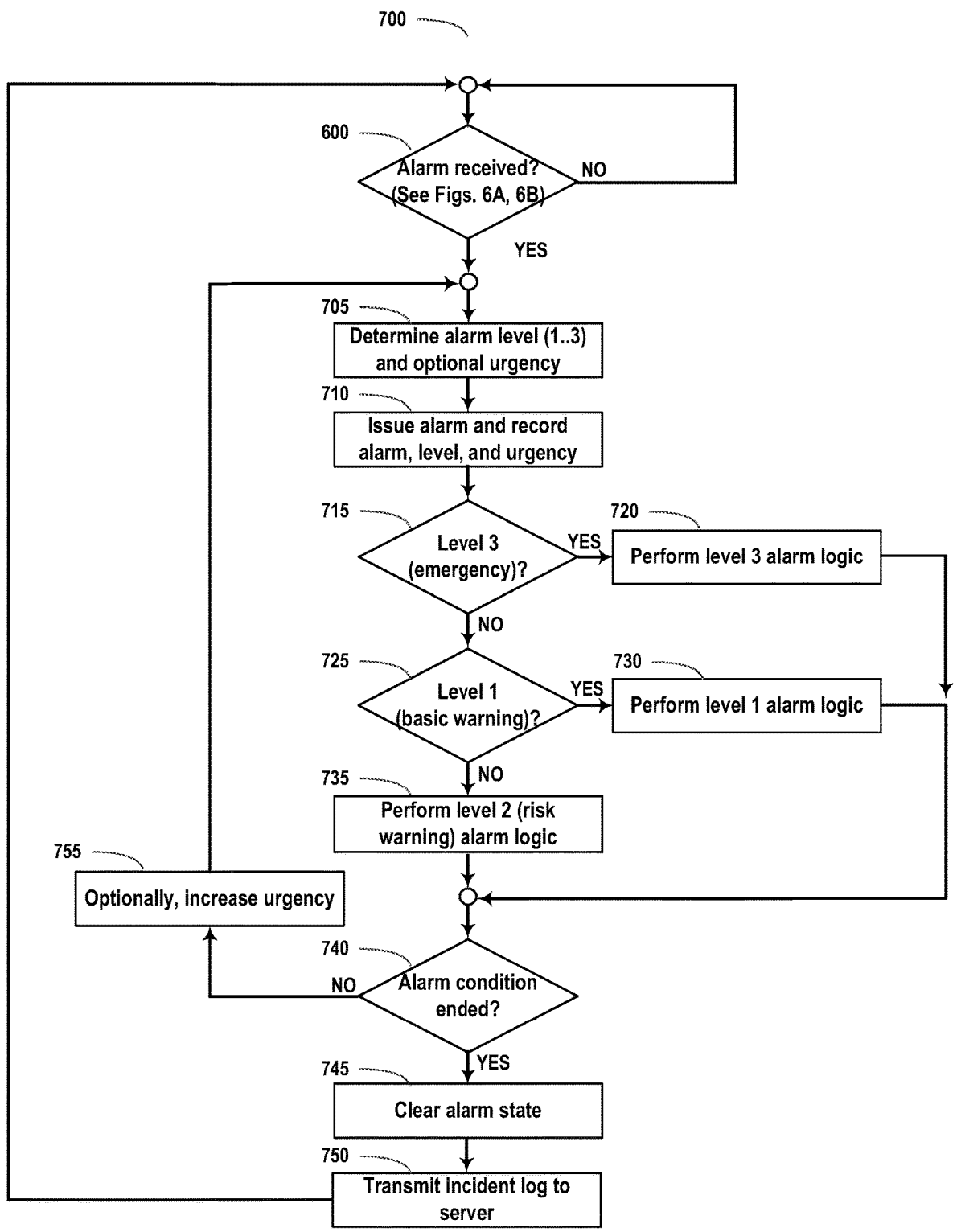
FIG. 7 is a block diagram illustration a method of alarm processing in an autonomous driving vehicle according to one embodiment.

FIG. 7 is a block diagram illustration a method 700 of alarm processing in an autonomous driving vehicle according to one embodiment.

In operation 600, it can be determined whether an alarm state is set, i.e., an alarm has been received. If not, then method 600 loops to itself to continually monitor for alarm states. If an alarm has been received, then method 700 continues at operation 705.

In operation 705, the alarm level, e.g. 1, 2, or 3, can be determined and an optional alarm urgency can be set. The alarm level can be stored in a variable or represented as a bit-mask, using 1 bit for each of the alarm states. A bit map implementation allows for multiple alarm states being set, of which only the highest alarm state will be issued as an alarm. Urgency can be a variable used to periodically increase an attention-getting mechanism to the human driver. For example, if a level 1 alarm state persists without acknowledgement from the human driver for a predetermined period of time, then the level 1 alarm may be increased in volume or frequency until acknowledged. An alarm may be acknowledged by the human driver making an acknowledgement input on a control panel, or by speaking an acknowledgement, or by the standby driver touching the ADV controls, including the steering control, throttle control, or brake control.

In operation 710, the alarm level is issued to the human driver. The alarm state is recorded, including ADV driving state information such as speed, heading, control inputs, a list of obstacles and their locations and trajectories. Recording of ADV states can continue until the alarm state is cleared.

In operation 715, it can be determined whether the alarm is a level 3 alarm. If so, then method 700 continues at operation 720, otherwise method 700 continues at operation 725.

In operation 720, ADV alarm module 308 performs level 3 alarm logic. Level 3 is an emergency state. Level 3 processing logic may turn off any entertainment audio or video that is present inside the ADV. Level 3 processing logic may release any of the control inputs to the human driver as soon as the human driver attempts to make an control input to navigation the ADV. For example, if the human driver steps on a braking control, the braking control will be released to the human driver. If the human driver attempts to turn the ADV using a steering control, the steering control can be released from ADV control and yielded to human driver control. If the human driver actuates the throttle control, then the throttle control can be released from ADV control and yielded to human driver control. In an embodiment, all control inputs are released from ADV control to human driver control upon actuation of any one of the control inputs by the human driver. Method 700 continues at operation 740.

In operation 725, it can be determined whether the alarm is a level 1, an alert warning. If so, then method 700 continues at operation 730, otherwise method 700 continues at operation 735.

In operation 730, alarm module 308 performs alarm level 1 logic. Level 1 alarm is a warning alarm, to get the human driver's attention. In level 1 logic, any entertainment audio may be lowered in volume or paused. Entertainment video may be paused. An audio and/or video alarm is issued to warning the human driver to be ready to take over control of the ADV navigation.

In operation 735, it has been determined that the alarm level is a level 2 alarm and alarm module 308 performs level 2 alarm logic. Level 2 alarm is a risk warning alarm indicating that the human driver may imminently be required to take over navigation of the ADV. Audio entertainment and video entertainment may be paused or turned off. The level 2 alarm is issued to the standby driver. The level 2 alarm may have be louder and/or a different tone than the level 1 alarm. ADV navigation control may be released to the human driver upon detection that the human driver has attempted to use any of the steering, throttle, or braking controls.

In operation 740, it can be determined whether the alarm condition has ended. An alarm condition has ended either when the conditions that caused the alarm have been remedied or otherwise changed, or the human driver actuates an "alarm clear" control to the ADV control logic. In an embodiment, "alarm clear," "release ADV control," "resume ADV control" can be audio commands spoken by the human driver. In an embodiment, "alarm clear" can include an implicit "resume ADV control" command. If the alarm condition is ended, then method 700 continues at operation 745, otherwise method 700 continues at operation 755.

In operation 745, the alarm state is cleared. The alarm state can be cleared automatically by the ADV control logic determining that the conditions which caused the alarm have ended. In an embodiment, a human driver issuing an "alarm clear" command verbally or by a control panel input can end the alarm state.

In operation 750, ADV alarm module 308 can transmit an alarm incident report containing all recorded information associated with the alarm incident. Method 700 resumes at operation 600.

In operation 755, the alarm urgency can optionally be increased, such as increasing in frequency or volume. Method 700 continues at operation 705. On return to operation 705, a higher level alarm state that previously processed may have been set. For example, conditions giving rise to a level 1 alarm state can become more urgent as the ADV continues to traverse its navigation path. It is possible for a level 1 alarm to escalate into a level 2 alarm state. Operation 705 can detect the increase in alarm state and process the alarm state accordingly.

Figure 8:
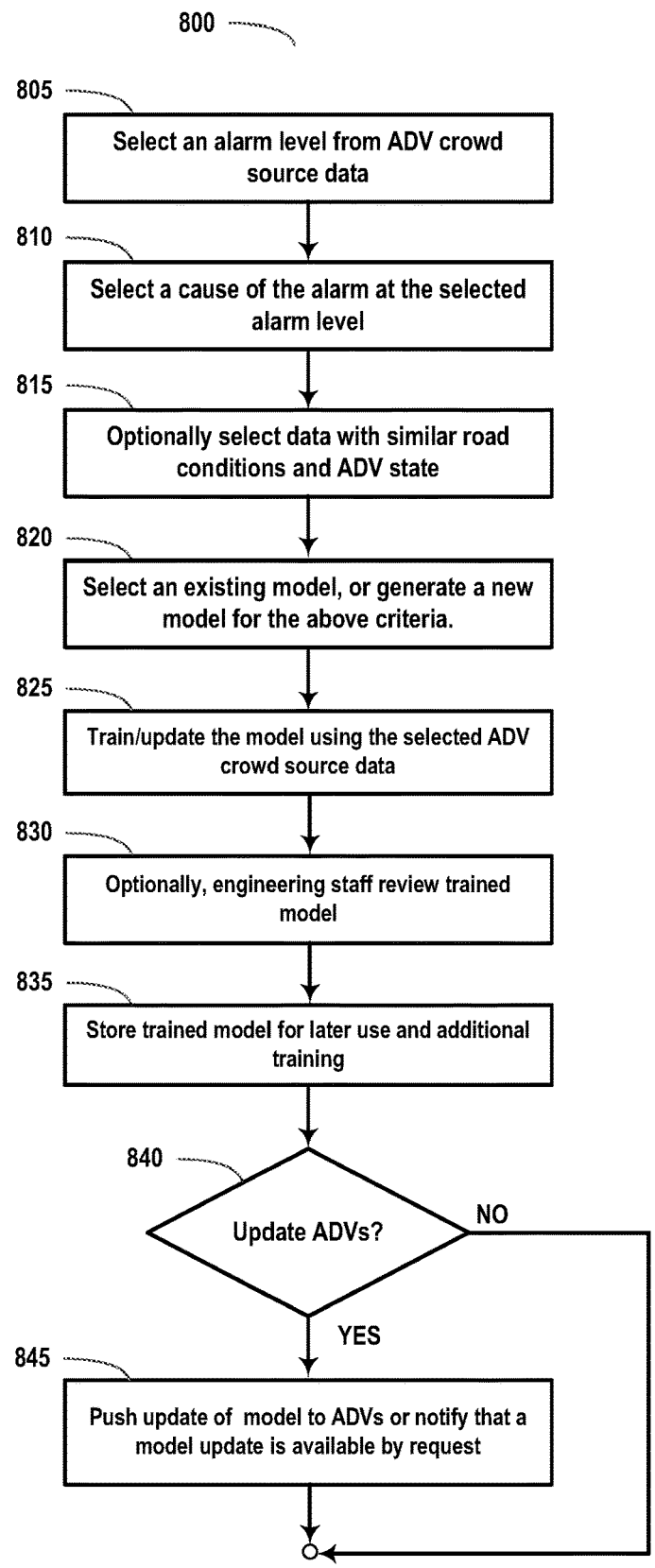
FIG. 8 is a block diagram of a method of using crowd-sourced autonomous driving vehicle alarm incident data to train a response model to alarm incidents according to one embodiment.

FIG. 8 is a block diagram of a method 800 of using crowd-sourced autonomous driving vehicle alarm incident data to train a response model to alarm incidents according to one embodiment. Training of a response model can include determining patterns in the root cause of alarm incidents at a particular alarm level, how the alarm condition was resolved, and any human driver inputs that may have aided in resolving the alarm condition.

In operation 805, an alarm level can be selected for use as an ADV crowd-source data selection criteria of ADV alarm incident reports.

In operation 810, an alarm cause can be selected for use as an ADV crowd-source data selection criteria of ADV alarm incident reports.

In operation 815, optionally, selection criteria may further include selecting road conditions under which the alarm occurred, e.g. rainy or snowy weather, gravel roadway, dirt road, etc.

In operation 820, an existing machine learning model can be selected from previously trained models matching the selection criteria. Alternatively, a new machine learning model can be generated using the ADV alarm incident report selection criteria.

In operation 825, machine learning server, e.g. server 103, machine learning engine 122, can train the machine learning model using the selected ADV alarm incident reports from ADV crowd-sourced data.

In operation 830, the trained model can optionally be reviewed by an engineering staff.

In operation 835, the machine learning model can be stored for later use and additional training by the machine learning server.

In operation 840, it can be determined whether there is sufficient learning, i.e. sufficient correlation between alarm incident reports and a trend line, that the trained machine learning model can be used to update ADV control logic. If the software of one or more ADVs is to be updated, then method 800 continues at operation 845, otherwise method 800 ends.

In operation 845, remote server can push an ADV software update to one or more ADVs, or notify one or more ADVs that an ADV software update is available for download on request.

Figure 9:
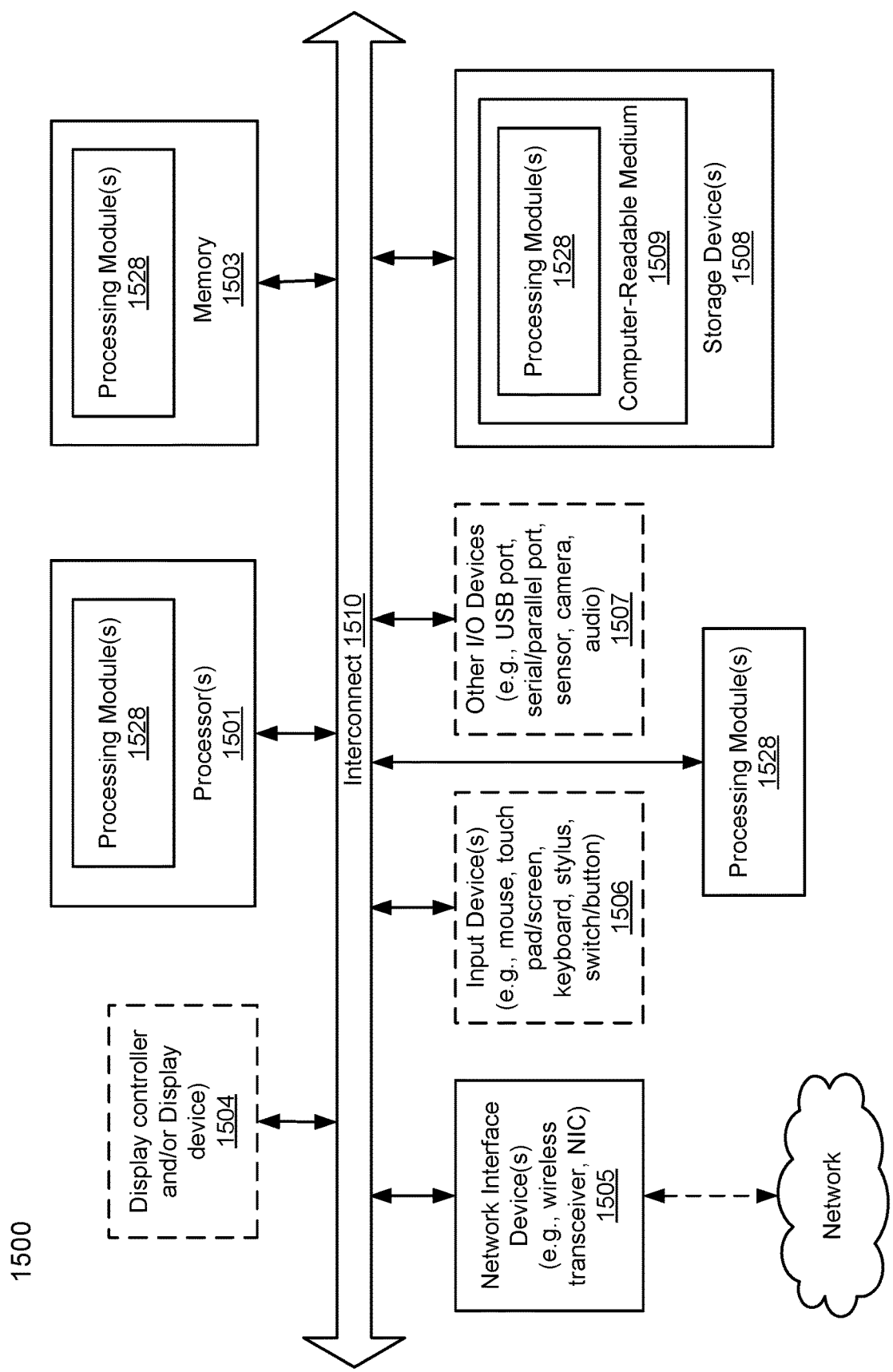
FIG. 9 is a block diagram illustrating a data processing system according to one embodiment.

FIG. 9 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305, control module 306, and/or alarm system 308, and risk module 309. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/ logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle (ADV), the method comprising:

monitoring states of the ADV in an autonomous driving mode, using a plurality of sensors mounted on the ADV, wherein an ADV state is characterized by a speed, heading, and location of the ADV, and control inputs to the ADV;

perceiving a driving environment surrounding the ADV using at least a portion of the sensors, the driving environment including speed and trajectory of one or more obstacles surrounding the ADV and including perceived traffic signs and signals;

analyzing the states of the ADV in view of the driving environment surrounding the ADV to determine whether one or more driving conditions are satisfied, the driving conditions including whether ADV navigation is adhering to a reference line of a navigation path and whether the ADV navigation is in compliance with traffic laws;

determining a risk assessment value for an ADV driving state, wherein the risk assessment value represents a probability of unsafe navigation of the ADV and an estimated severity of a driving outcome due to risks associated with the ADV state, driving conditions, and perceived environment surrounding the ADV, and the risk assessment value is based, at least in part, upon a risk model that correlates alarm levels, ADV states, driving environments, and driving conditions to a risk value;

determining an alarm warning level, from a plurality of alarm warning levels, based on the risk value, driving conditions in view of a set of alarm warning rules, and an operating state of one or more ADV subsystems, wherein the determined alarm warning level is one of a plurality of alarm warning levels that include a basic warning level, a risk warning level, and an emergency warning level;

generating an alarm to a driver of the ADV that a human driver is to be prepared to take over driving of the ADV, wherein the alarm is presented in a manner corresponding to the determined alarm warning level;

recording the alarm warning level, recording the operating state of the one or more ADV subsystems, and in response to the human driver taking control of the ADV, recording human driver control inputs;

generating an alarm warning level incident report, wherein the recording of the human driving control inputs continues until an alarm state ends; and uploading the incident report to a remote server to train an ADV navigation model how a human driving responded to the alarm according to the recorded human driving inputs.

2. The method of claim 1, wherein each of the plurality of alarm warning levels conveys a different urgency level for a human driver to take over driving of the ADV, wherein the basic warning level and risk warning level are not triggered by an ADV subsystem failure, the method further comprising:
in response to determining that the alarm has persisted for a threshold period of time and that a risk to safety of passengers, to safety of pedestrians, or risk of an accident has become more likely, increasing the alarm warning level to a higher alarm warning level.

3. The method of claim 2, wherein all of the following conditions are monitored, and wherein the alarm level is an emergency warning level when any of the following conditions occurs:
a module of a perception and planning system of the ADV has failed;
a module of a sensor system of the ADV has failed;
a module of a control system of the ADV has failed; or
an emergency driving situation is detected that requires a human driver to control the ADV.

4. The method of claim 2, wherein the alarm level is a basic warning level, indicating that a human driver is to prepare to take over control of the ADV to maintain passenger comfort or passenger safety.

5. The method of claim 2, wherein the alarm level is risk warning level, indicating that a driving condition contains risk such that a human driver may imminently need to take over the controlling the ADV to mitigate a risk of injury or damage to one or more vehicles or property.

6. The method of claim 5, wherein the conditions under which a risk warning level is triggered are configurable.

7. The method of claim 1, further comprising:
receiving an ADV control system software update from a server device, the update based at least in part on one or more incident reports of a plurality of ADVs; and
navigating the ADV in autonomous driving mode in accordance with the received ADV control system software update.

8. A non-transitory computer-readable medium programmed with executable instructions that, when executed by a processing system comprising at least one hardware processor, perform operations that implement a method for operating an autonomous driving vehicle (ADV), the operations comprising:
monitoring states of the ADV in autonomous driving mode using a plurality of sensors mounted on the ADV, wherein an ADV state is characterized by a speed, heading, and location of the ADV, and control inputs of the ADV;
perceiving a driving environment surrounding the ADV using at least a portion of the sensors, the driving environment including speed and trajectory of one or more obstacles surrounding the ADV and including perceived traffic signs and signals;
analyzing the states of the ADV in view of the driving environment surrounding the ADV to determine whether one or more driving conditions are satisfied, the driving conditions including whether ADV navigation is adhering to a reference line of a navigation path and whether the ADV navigation is in compliance with traffic laws;
determining a risk assessment value for an ADV driving state, wherein the risk assessment value represents a probability of unsafe navigation of the ADV and an estimated severity of a driving outcome due to risks associated with the ADV state, driving conditions, and perceived environment surrounding the ADV, and the risk assessment value is based, at least in part, upon a risk model that correlates alarm levels, ADV states, driving environments, and driving conditions to a risk value;
determining an alarm warning level, from a plurality of alarm warning levels, based on the risk value, driving conditions in view of a set of alarm warning rules, and an operating state of one or more ADV subsystems, wherein the determined alarm warning level is one of a plurality of alarm warning levels that include a basic warning level, a risk warning level, and an emergency warning level;
generating an alarm to a driver of the ADV that a human driver is to be prepared to take over driving of the ADV, wherein the alarm is presented in a manner corresponding to the determined alarm warning level;
recording the alarm warning level, recording the operation state of the ADV of one or more ADV subsystems, and, in response to the human driving taking control of the ADV, recording human driver control inputs;
generating an alarm warning level incident report, wherein the recording of the human driving control inputs continues until an alarm state ends; and
uploading the incident report to a remote server to train an ADV navigation model how a human driving responded to the alarm according to the recorded human driving inputs.

9. The medium of claim 8, wherein each of the plurality of alarm warning levels conveys a different urgency level for a human driver to take over driving of the ADV, wherein the basic warning level and risk warning level are not triggered by an ADV subsystem failure.

10. The medium of claim 9, wherein all of the following conditions are monitored, and wherein the alarm level is emergency warning level when any of the following conditions occurs:
a module of a perception and planning system of the ADV has failed;
a module of a sensor system of the ADV has failed;
a module of a control system has failed of the ADV; or
an emergency driving situation is detected that requires a human driver to control the ADV.

11. The medium of claim 9, wherein the alarm level is basic warning level, indicating that a human driver is to prepare to take over control of the ADV to maintain passenger comfort or passenger safety.

12. The medium of claim 9, wherein the alarm level is risk warning level, indicating that a driving condition contains risk such that a human driver may imminently need to take over the controlling the ADV to mitigate a risk of injury or damage to one or more vehicles or property.

13. The medium of claim 12, wherein the conditions under which a risk warning level is triggered are configurable.

14. The medium of claim 8, the operations further comprising:
receiving an ADV control system software update from a server device, the update based at least in part on one or more incident reports of a plurality of ADVs; and navigating the ADV in autonomous driving mode in accordance with the received control system software update.

15. A system comprising a processing system comprising at least one hardware processor, coupled to a memory programmed with executable instructions that when executed by the processing system, perform operations that implement a method for operating an autonomous driving vehicle (ADV), the operations comprising:
monitoring states of the ADV in autonomous driving mode, using a plurality of sensors mounted on the ADV, wherein an ADV state is characterized by a speed, heading, and location of the ADV, and control inputs to the ADV;
perceiving a driving environment surrounding the ADV using at least a portion of the sensors, the driving environment including speed and trajectory of one or more obstacles surrounding the ADV and including perceived traffic signs and signals;
analyzing the states of the ADV in view of the driving environment surrounding the ADV to determine whether one or more driving conditions are satisfied, the driving conditions including whether ADV navigation is adhering to a reference line of a navigation path and whether the ADV navigation is in compliance with traffic laws;
determining a risk assessment value for an ADV driving state, wherein the risk assessment value represents a probability of unsafe navigation of the ADV and an estimated severity of a driving outcome due to risks associated with the ADV state, driving conditions, and perceived environment surrounding the ADV, and the risk assessment value is based, at least in part, upon a risk model that correlates alarm levels, ADV states, driving environments, and driving conditions to a risk value;
determining an alarm warning level, from a plurality of warning levels, based on the risk value, driving conditions in view of a set of alarm warning rules, and an operating state of the one or more ADV subsystems, wherein the determined alarm warning level is one of a plurality of alarm warning levels that include a basis warning level, a risk warning level, and an emergency warning level;
generating an alarm to a driver of the ADV that a human driver is to be prepared to take over driving of the ADV, wherein the alarm is presented in a manner corresponding to the determined alarm warning level;
recording the alarm warning level, recording the operating state of the one or more ADV subsystems, and, in response to the human driving taking control of the ADV, recording human driver control inputs;
generating an alarm warning level incident report, wherein the recording of the human driving control inputs continues until an alarm state ends; and
uploading the incident report to a remote server to train an ADV navigation model how a human driving responded to the alarm according to the recorded human driving inputs.

16. The system of claim 15, wherein each of the plurality of alarm warning levels conveys a different urgency level for a human driver to take over driving of the ADV, wherein the basic warning level and risk warning level are not triggered by an ADV subsystem failure.

17. The system of claim 16, wherein all of the following conditions are monitored, and wherein the alarm level is emergency warning level when any of the following conditions occur:
a module of a perception and planning system of the ADV has failed;
a module of a sensor system of the ADV has failed;
a module of a control system of the ADV has failed; or
an emergency driving situation is detected that requires a human driver to control the ADV.

18. The system of claim 16, wherein the alarm level is basic warning level, indicating that a human driver is to prepare to take over control of the ADV to maintain passenger comfort or passenger safety.

19. The system of claim 16, wherein the alarm level is risk warning level, indicating that a driving condition contains risk such that a human driver may imminently need to take over the controlling the ADV to mitigate a risk of injury or damage to one or more vehicles or property.

20. The system of claim 19, wherein the conditions under which a risk warning level is triggered are configurable.

21. The system of claim 15, the operations further comprising:
receiving an ADV control system software update from a server device, the update based at least in part on one or more incident reports of a plurality of ADVs; and
navigating the ADV in autonomous driving mode in accordance with the received ADV control system software update.

22. A server device comprising a processing system having at least one hardware processor, coupled to a memory programmed with executable software instructions that, when executed, cause the server to perform operations including:
receiving, from a plurality of autonomous driving vehicles (ADVs), one or more incident reports in which an ADV generated an alarm based on a risk assessment value for an ADV driving state, wherein the risk assessment represents a probability of unsafe navigation of the ADV and an estimated severity of a driving outcome due to risks associated with the ADV driving state, driving conditions, and perceived environment surrounding the ADV, and the risk assessment value is based, at least in part, upon a risk model that correlates alarm levels, ADV driving states, driving environments, and driving conditions to a risk value, and the alarm is based on the risk value, ADV driving conditions in view of a set of alarm warning rules, and an operating state of one or more subsystems of the ADV, wherein the determined alarm warning level is one of a plurality of alarm warning levels that include a basic warning level, a risk warning level, and an emergency warning level, each of the plurality of alarm warning levels conveying a different urgency level for a human driver to take over driving of the ADV, and each ADV having control logic comprising a plurality of modules wherein an ADV driving state is characterized by speed, heading, and location of the ADV, and by control inputs to the ADV in autonomous driving mode, wherein a driving environment includes a speed and trajectory of one or more obstacles surrounding the ADV and further includes perceived traffic signs and signals, and wherein driving conditions include whether ADV navigation is adhering to a reference line of a navigation path of the ADV and whether the ADV navigation is in compliance with traffic laws;

selecting an alarm level and one or more causes of the alarm level;

selecting incident reports having the alarm level and the one or more causes of the alarm level, the incident reports including the alarm warning level, one or more ADV states occurring during the alarm warning, human driver control inputs recorded in response to the human driver taking control of the ADV, the human driver control inputs recorded after the alarm warning was issued to the human driver and continuing to be recorded until the alarm ended;

selecting, or generating, a machine learning model for the alarm level and one or more causes of the alarm level;

training the machine learning model using the selected incident reports using the human driver control inputs, alarm warning level, one or more ADV states, driving conditions, and driving environment recorded in the selected incident reports;

updating at least one logic module of the ADV control system logic of one or more ADVs to utilize the trained machine learning model.

\* \* \* \* \*